United States Patent
Kelly (10) Patent No.: US 9,584,247 B1
(45) Date of Patent: Feb. 28, 2017

(54) FLEXIBLE ROADM-LESS OPTICAL HUB AND SPOKE NODE ARCHITECTURE FOR COHERENT TRANSPONDERS

(71) Applicant: Alcatel-Lucent Canada Inc., Ottawa (CA)

(72) Inventor: Colin Geoffrey Kelly, Ottawa (CA)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/575,325

(22) Filed: Dec. 18, 2014

Related U.S. Application Data (60) Provisional application No. 61/926,092, filed on Jan. 10, 2014.

(51) Int. Cl.
  *H04J 14/02* (2006.01)

(52) U.S. Cl.
  CPC ...... *H04J 14/0204* (2013.01); *H04J 14/0205* (2013.01)

(58) Field of Classification Search
  CPC ..................................... H04J 14/0201–14/022
  See application file for complete search history.

(56) References Cited

U.S. PATENT DOCUMENTS

| | | | |
|---|---|---|---|
| 6,842,562 B2 | 1/2005 | Kinoshita et al. | |
| 7,116,860 B1 | 10/2006 | Gerstel et al. | |
| 2005/0129403 A1 | 6/2005 | Koopferstock | |
| 2011/0268442 A1 | 11/2011 | Boertjes et al. | |
| 2012/0002964 A1* | 1/2012 | Takatsu | H04J 14/0204 398/50 |
| 2012/0301137 A1* | 11/2012 | Sakamoto | H04B 10/0771 398/16 |
| 2014/0363161 A1* | 12/2014 | Oikawa | H04J 14/0202 398/48 |

FOREIGN PATENT DOCUMENTS

WO 0057590 A1 9/2000

* cited by examiner

*Primary Examiner* — David Payne
*Assistant Examiner* — Casey Kretzer
(74) *Attorney, Agent, or Firm* — Andrew R. Ralston (57) ABSTRACT

One embodiment provides a network node of a metro optical network that includes first and second optical filters. The first optical filter is configured to pass wavelength channels in a first wavelength band and block wavelength channels in a non-overlapping second wavelength band. The second optical filter is configured to block wavelength channels of the first wavelength band and pass wavelength channels of the second wavelength band. An optical splitter is configured to split a received optical signal into first and second signal portions and to direct the first signal portion to the first optical filter. An optical combiner is configured to combine output of the second optical filter with the second signal portion from the optical splitter. An optical transceiver is configured to recover data from a first wavelength channel passed by the first optical filter, and to output a second wavelength channel passed by the second optical filter.

26 Claims, 5 Drawing Sheets

FLEXIBLE ROADM-LESS OPTICAL HUB AND SPOKE NODE ARCHITECTURE FOR COHERENT TRANSPONDERS

CROSS-REFERENCE TO RELATED APPLICATION

This application claims the benefit of U.S. Provisional Application Ser. No. 61/926,092, filed on Jan. 10, 2014, commonly assigned with this application and incorporated herein by reference.

TECHNICAL FIELD

The disclosure relates generally to the field of optical communication.

BACKGROUND

This section introduces aspects that may be helpful to facilitating a better understanding of the inventions. Accordingly, the statements of this section are to be read in this light and are not to be understood as admissions about what is in the prior art or what is not in the prior art.

To drop just a single wavelength of a multi-channel optical signal at a receiver, current metro architectures sometimes use a fixed or reconfigurable drop optical filter. Dropping a channel is typically required for non-coherent receivers, which cannot accept more than one wavelength. The use of fixed filters in the drop direction results in a static coloring arrangement, which does not provide sufficient flexibility for some applications. This can be resolved by the use of reconfigurable optical add/drop multiplexer (ROADM) node architectures based on wavelength blockers or wavelength selective switches (WSSs). However, these components can add considerable infrastructure cost and loss.

Alternatively, the receiver of a coherent optical transponder (OT) can accept multiple wavelength channels and tune to a specific desired channel. However, most optical solutions are still based on either ROADM or simple passive splitter technology. Architectures based on passive splitters are viable for small networks, but are usually too limited in the number of services they can support, depending on the specifications of the coherent OTs. In the drop direction, there may be a limit to the number of wavelengths that can be dropped to each receiver, due to front-end common-mode rejection ratio (CMRR) and dynamic range restrictions, especially in a low cost network without spectral equalization capabilities for ripple reduction. In the add direction, many of the newer generation of coherent optical transponders contain transmit amplifiers that result in broadband noise that can get added to all other add wavelengths and through-path wavelengths, whether or not they originate at the node in question. This broadband amplified spontaneous emission (ASE) noise can be prefiltered, either on a per-transponder basis or for a small set of transponders, while keeping coloring flexibility, by either the use of tunable optical filters or an add path wavelength-selective switch (WSS), but this may be incompatible with the goal of a low-cost architecture.

SUMMARY

The following presents a simplified summary of the disclosed subject matter in order to provide an understanding of some aspects of the disclosed subject matter. This summary is not an exhaustive overview of the disclosed subject matter and is not intended to identify key or critical elements of the disclosed subject matter not to delineate the scope of the disclosed subject matter. Its sole purpose is to present some concepts in a simplified form as a prelude to the more detailed description that is discussed later.

One embodiment provides a first apparatus that includes a first optical splitter and a first optical filter. The splitter is configured to split a received optical signal into first and second signal portions. The filter is configured to pass wavelength channels of the first signal portion in a first wavelength band and block wavelength channels of the first signal portion in a non-overlapping second wavelength band. An optical transponder may recover data from a selected wavelength channel passed by the optical filter.

Some embodiments of the apparatus also include a second optical filter and an optical combiner. The second filter is configured to block wavelength channels of the first wavelength band and to pass wavelength channels of the second wavelength band. The combiner is configured to combine an added wavelength channel passed by the second filter with the second signal portion from the splitter.

Some embodiments further include a second optical splitter and a third optical filter. The second splitter is configured to split an output of the combiner into third and fourth signal portions. The third optical filter is configured to pass wavelength channels of the third signal portion in the first wavelength band and block wavelength channels of the third signal portion in the second wavelength band.

Some embodiments of the apparatus further include a fourth optical filter and a second optical combiner. The fourth filter is configured to block wavelength channels of the first wavelength band and to pass wavelength channels of the second wavelength band. The second combiner is configured to combine the fourth signal portion with added wavelength channels passed by the fourth filter.

Some such embodiments also include first and second optical transmitters. The first optical transmitter is configured to output a first wavelength channel in the second wavelength band to the second optical filter, and the second optical transmitter is configured to output a second different wavelength channel in the second wavelength band to the fourth optical filter.

Another embodiment provides a second apparatus that includes first and second optical filters each being configured to block wavelength channels of a first wavelength band and to pass wavelength channels of a second wavelength band. A first optical transmitter is configured to direct a first wavelength channel in the second wavelength band to the first optical filter. A second optical transmitter is configured to direct a second wavelength channel in the second wavelength band to the second optical filter. An optical combiner is configured to combine the first and second wavelength channels.

In some embodiments the apparatus also includes a third optical filter and an optical splitter. The third filter is configured to pass wavelength channels in the first wavelength band and to block wavelength channels in the second wavelength band. The splitter is configured to split output of the first optical filter into a first signal portion directed toward the third optical filter and a second signal portion directed toward the combiner.

Yet another embodiment provides network node of a metro optical network that includes first and second optical filters, an optical splitter, and an optical combiner. The first filter is configured to pass wavelength channels in a first wavelength band and block wavelength channels in a non-overlapping second wavelength band. The second filter is configured to block wavelength channels of the first wavelength band and to pass wavelength channels of the second wavelength band. The splitter is configured to split a received optical signal into first and second signal portions, and to direct the first signal portion to the first filter. The combiner is configured to combine the second signal portion and output of the second optical filter. An optical receiver is configured to recover data from a first wavelength channel passed by the first optical filter, and an optical transmitter is configured to direct to the second filter a second wavelength channel in the second wavelength band.

Various embodiments provide methods for configuring the above-described apparatus. In any of the described embodiments the first wavelength band may occupy a shorter-wavelength portion of the optical spectrum than does the second wavelength band.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. Moreover, a first element and second element may be implemented by a single element able to provide the necessary functionality of separate first and second elements.

As used herein the description, the term "and" is used in both the conjunctive and disjunctive sense and includes any and all combinations of one or more of the associated listed items. It will be further understood that the terms "comprises", "comprising,", "includes" and "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Embodiments presented herein provide, e.g., low-cost implementations of optical components in an optical network to effect dropping of an optical channel at a network node. Such embodiments avoid the use of a ROADM through the use of a wavelength-selective splitter, e.g. a splitter incorporating a low-pass or a high-pass filter. A splitter that blocks lower-frequency light, referred to herein as a B/R or "blue drop" filter, may block longer wavelength, e.g. "redder", signals or channels. A splitter that blocks higher-frequency light, referred to herein as an R/B or "red add" filter, may block shorter wavelength, e.g. "bluer", signals or channels. The combination of the B/R and R/B filters may reduce amplified spontaneous emission (ASE) noise that could otherwise accumulate in a transmit path. The reduction of ASE noise by the relatively inexpensive filters may thereby achieve at lower cost system performance effectively equivalent to systems that employ reconfigurable optical add-drop multiplexers (ROADMs).

Figure 1:
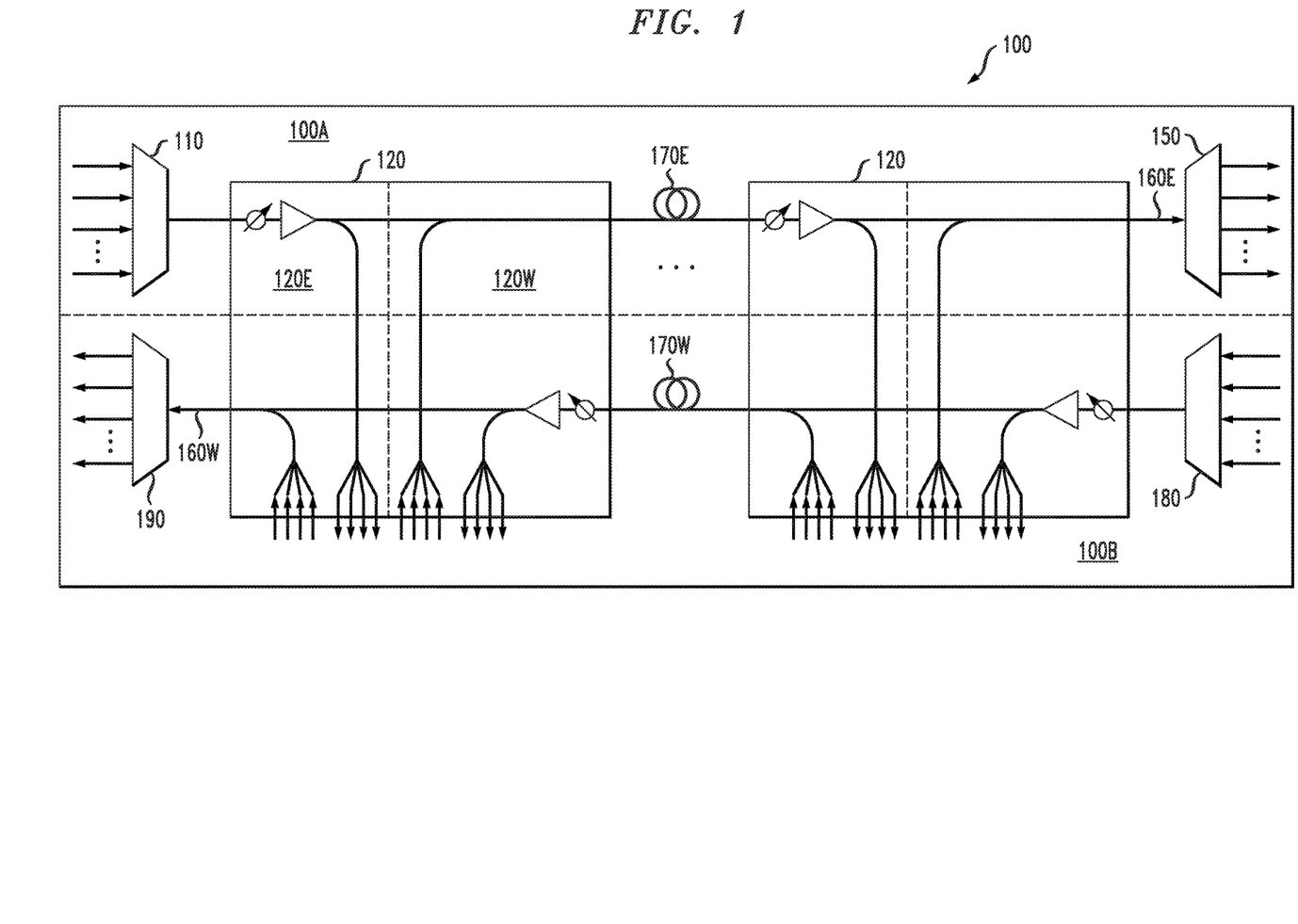
FIG. 1 illustrates an optical communication system e.g. a metro system, configured using splitter-based add-drop nodes according to one embodiment.

FIG. 1 illustrates an embodiment, e.g. an optical communications network 100. The network 100 may be, but is not limited to being, part of a metro optical data communication network. Those skilled in the optical arts will appreciate that in this context "metro" signifies a network that operates over a relatively short distance, e.g. in contrast to long-haul networks. For example, a metro network may operate over a range of tens of kilometers, while a long-haul network may operate over a range of thousands of kilometers. Moreover, a metro network typically differs from a long-haul network by including a larger number of add and/or drop nodes per unit distance. For instance, the metro-network may serve numerous closely-spaced buildings within a city, with each building adding and/or dropping an optical channel of the network. In contrast, a long-haul network may include transmission distances of 1000 or more kilometers without any add/drop node, e.g. a submarine network.

The network 100 includes a west-to-east (W-E) leg 100A and an east-to-west (E-W) leg 100B. Of course, such directional designations are for discussion purposes and do not limit embodiments in any way. Referring to the W-E leg 100A, illustrated are an input multiplexer (MUX) 110 and an output MUX 150. The leg 100A operates to transmit an optical signal 160E via one or more optical spans 170E. Similarly, the E-W leg 100B includes an input multiplexer (MUX) 180 and an output MUX 190. The leg 100B operates to transmit an optical signal 160W via one or more optical spans 170W. The spans 170E and 170W may be a same physical optical fiber path. The MUXes 110, 150, 180 and 190 may be located at hubs of the network 100.

Add/drop nodes 120 are located between the MUXes 110, 190 and the MUXes 150, 180. While two instances of the nodes 120 are shown, embodiments are not limited to any particular number. Any particular add/drop node 120 may include an "east card" 120E and a "west card" 120W. The east card 120e may operate to split out eastward traveling channels and add to westward traveling channels. The west card 120w may operate to split out westward traveling channels and add to eastward traveling channels.

Figure 2:
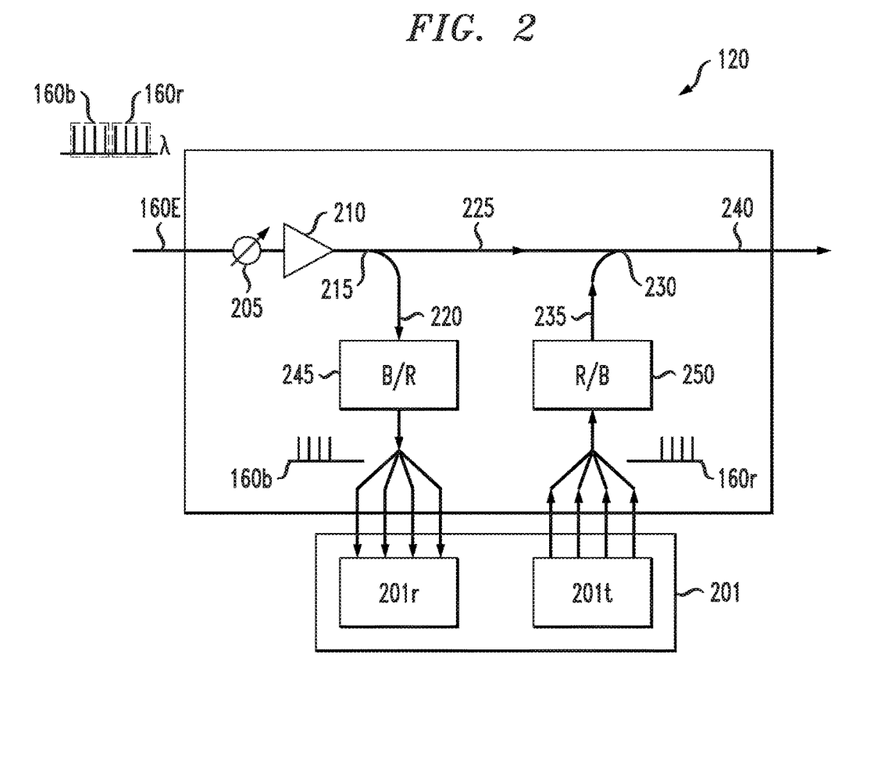
FIG. 2 illustrates a logical grouping of some features of one of the add/drop nodes of FIG. 1.

FIG. 2 illustrates in greater detail an example of one instance of the add/drop node 120, according to one embodiment. This example is described with reference to the W-E leg 100A, and some functionality of the add/drop node 120 has been omitted for simplicity, and illustrated functionality has been rearranged to focus the discussion on relevant aspects. In particular, the drop functionality of the west card 120w and the add functionality of the east card 120e are omitted, while the add functionality of the west card 120w and the drop functionality of the east card 120e have been combined into a single logical block. Additionally, an OT 201 is shown, which includes a block of receivers (RX) 201r and a block of transmitters (TX) 202t. Those skilled in the pertinent art will appreciate that an optical transponder is often described as including a receiver and transmitter operating at a same single wavelength. In this discussion the OT 201 is recognized in some embodiments as including multiple single-wavelength transponders, without limitation as to the number of wavelength channels, of which selected transmit and selected receive wavelength channels are shown. Moreover, for clarity of discussion, multiple receivers are shown collected in a single RX 201r, and multiple transmitters are shown collected in a single TX 201t. This logical grouping is presented without limitation as to the configuration of actual embodiments. The illustrated embodiment includes four receive and four transmit channels.

The signal 160E is initially received by a variable optical attenuator (VOA) 205 and a fixed amplifier 210. The signal 160E may be a wavelength-division multiplexed (WDM) signal having a number of wavelength channels each at a different wavelength. A drop splitter 215 splits the signal 160E into a dropped signal component 220 and a remaining signal component 225 that continues in the span 170E. An add splitter (i.e. combiner) 230 combines an added signal component 235 with the component 225 to form a combined propagated signal 240. The combined propagated signal 240 propagates further in the leg 100A. The amplifier 210 may be used to compensate for power losses of optical signals, e.g. caused by the splitters 215 and 230.

Referring to the splitter 215, an optical filter 245 receives the dropped component 220. The filter 245 is configured to pass "blue" channels, e.g. channels of the signal 160E having relatively shorter wavelengths. Thus, in the illustrated example of the signal 160E including "blue" channels 160b and "red" channels 160r, the filter 245 is configured to pass the channels 160b and to block the channels 160r. Thus the filter 245 is referred to as a B/R drop filter. The channels 160b may be referred to herein a "blue color group" or similar, and the channels 160r may be referred to as a "red color group" or similar. The filter 245 may optionally have preconfigured non-adjustable passband characteristics. Herein a filter configured in this manner may be referred to as a "fixed filter". The RX 201r receives the channels 160b and performs various functions, e.g. coherent detection and data decoding.

Referring to the added signal component 235, this signal is output from an optical filter 250. The filter 250 is configured to pass "red" channels, e.g. channels of the signal 160E having relatively longer wavelengths, e.g. a red color group. Thus, in the illustrated example, the filter 250 is configured to pass the red color group 160r and to block the blue color group 160b. Thus the filter 250 is referred to as an R/B add filter. The filter 250 may optionally be a fixed filter. The filter 250 receives at least one channel belonging to the channels 160r from the TX 201t, the at least one channel originating from the node of which the particular add/drop node 120 is a part. These channels have been processed by the TX 201t, e.g. to encode data and modulate onto a coherent optical signal.

Figure 3:
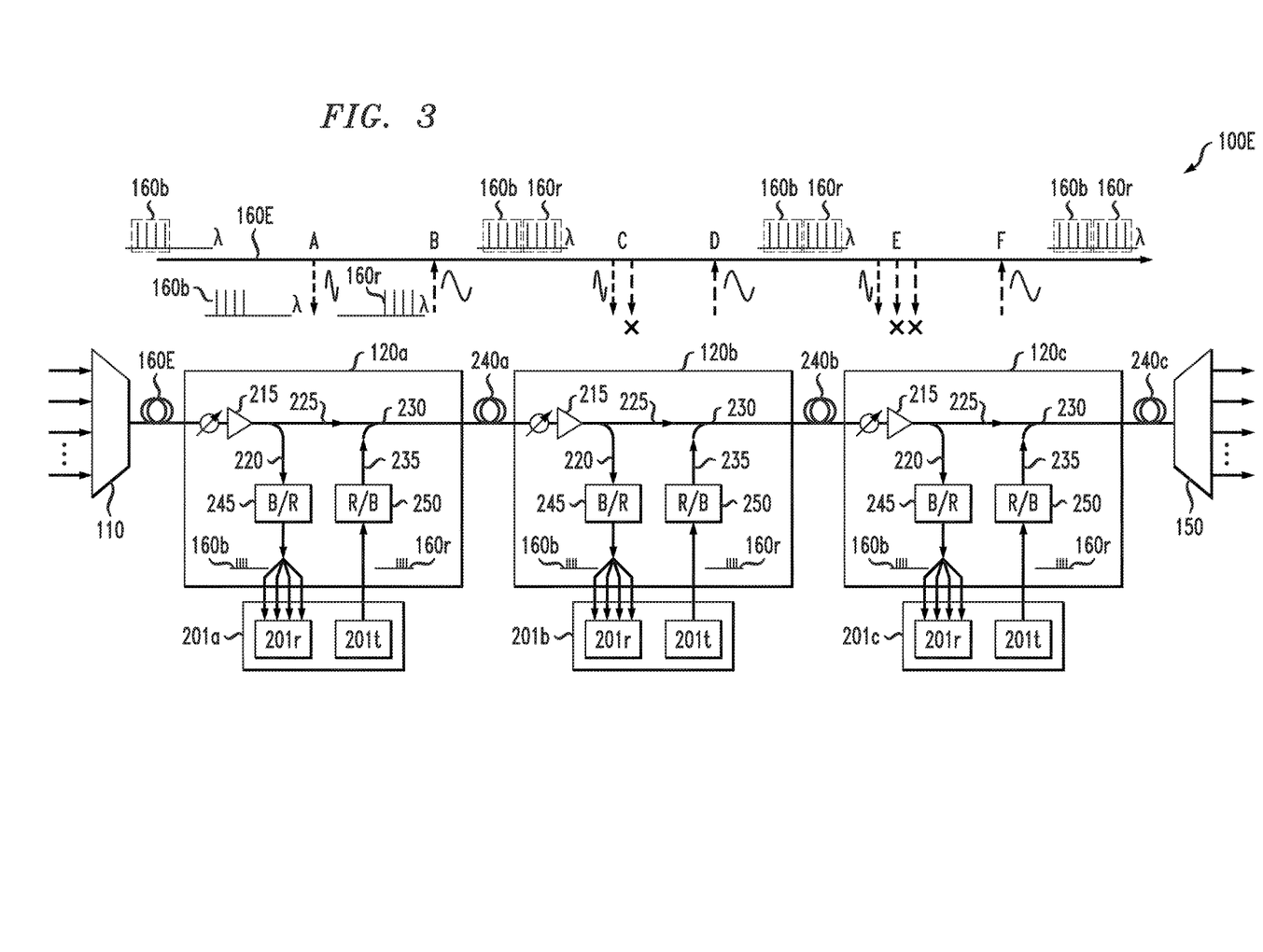
FIG. 3 illustrates one direction of the system of FIG. 1, including added and dropped wavelength channels according to an embodiment.

Referring to FIG. 3, the operation of the W-E leg 100A is described in view of the preceding description of the add/drop node 120. Three instances of the node 120 are shown, designated 120a, 120b and 120c, each having similarly designated instances of the OTs 201. The signal 160E may initially include only channels of the blue color group 160b. At the node 120a by operation of the B/R filter 245 all of the blue channels 160b may be routed to the RX 201r of the OT 201a, with one or more blue channels 160b being received (dropped) by the RX 201r. This is illustrated schematically by a short-dashed arrow at "A". (For the purpose of this disclosure and the claims, the term "dropped" refers to channels that are received at a node 120 after a portion of the received signal, 160E, is split and filtered by a B/R filter 245. This receiving is different from the dropping of channels, e.g. via an add-drop multiplexer as performed in some WDM systems, in that a remaining portion of the dropped channel signals continues to propagate in the remaining signal component 225.) A remaining light portion of the blue channels 160b also continues propagating on the signal 160E. An instance of the TX 201t may add, via the R/B filter 250 and the splitter 230, one or more red channels 160r to the propagating blue channels to form a combined propagated signal 240a. This is indicated by the long-dashed arrow at "B". The transmitter blocks 201t are illustrated without limitation as transmitting a single wavelength signal to the corresponding R/B filter 250. Typically, the wavelengths of these signals are unique and correspond to a single channel within the passband of the filter 250, e.g. within the block of channels 160r.

At the node 120b, another one or more blue channels may be received by the RX 201r of the OT 201b, as indicated by the short-dashed arrow at "C". But the red channel(s) added at the node 120a are blocked by the filter 245, as indicated by the "X" at the long-dashed arrow at "C". The node 120b may add another one or more red channels to the signal 160E to form a combined propagated signal 240b, as indicated by the long-dashed arrow at "D".

At the node 120c, another one or more blue channels may be received by the RX 201r of the OT 201c, as indicated by the short-dashed arrow at "E". Again, the red channel(s) added at the nodes 120a and 120b are blocked by the filter 245, as indicated by the "X" at each of the two long-dashed arrows at "E". The node 120c may add yet another one or more red channels to the signal 160E to form a combined propagated signal 240c, as indicated by the long-dashed arrow at "F".

It may be preferable, but is not required, that the filters 245 of the nodes 120 have the same transmission characteristics, e.g. pass the same blue channels. Similarly, it may be preferable, but is not required, that the filters 250 may have the same transmission characteristics, e.g. pass different same red channels.

The filters 245 and 250 configured as described provide, among other things, that hub-to-node traffic is carried by blue channels, and node-to-hub traffic is carried by red channels. By separating the traffic in this manner, the service count of the network 100 may be doubled relative to conventional implementations. In such conventional systems, an OT carrying N (e.g. 16) channels must share these channels between W-E and E-W demands. Embodiments provide all the N channels may be used in both directions, a significant increase in resource efficiency. Moreover, by filtering high frequencies out, the R/B filter 250 at least partially blocks ASE noise from the TX 201t that could otherwise have the effect of reducing the signal-to-noise (S/N) ratio of the network 100.

Thus, embodiments may provide a low-cost node architecture that can support hub-to-spoke and hub-to-hub demands without requiring optical receivers with sufficient CMRR or dynamic range to support both the hub-to-spoke and spoke-to-hub wavelength count. For systems in which OT limitations dominate, the number of services that can be supported effectively doubles relative to conventional system configurations, without requiring tunable filters or ROADM capabilities. At the same time, the link budgets in the hub-to-spoke direction are not impacted by ASE noise produced by the OTs (if present) located between the hubs. The resulting solution can easily support 16 to 20 bidirectional demands per hub degree (or 16-20 protected bidirectional services) within an optical ring. However, embodiments are not limited to any particular number of demands.

While the previous and following description refers to the use of red channels or color groups for node-to-hub demands and blue channels or color groups for hub-to-node demands, embodiments are not limited to such color assignment. For example, the roles of the red and blue color groups may be switched, though at the possible expense of the beneficial reduction of ASE noise provided by the R/B filter 250.

In some embodiments the RX 201r and TX 201t carry more than 2N channels. In such embodiments, it may be preferable that any unused channels be used to form a spectral gap between red channels and blue channels. In some cases such a configuration may, e.g. reduce the design tolerance, and therefore cost, of the filters 245 and 250.

Figure 4:
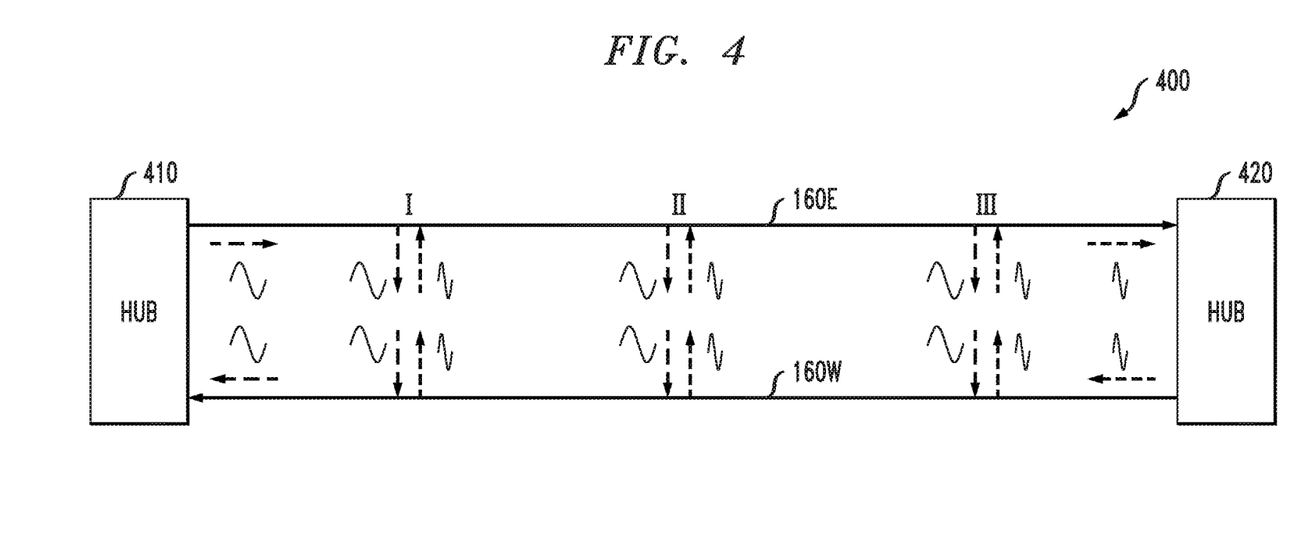
FIG. 4 illustrates an example configuration of a system according to one embodiment, in which one network hub transmits and receives channels in one color group, and another network hub transmits and receives channels in another different color group.

FIG. 4 illustrates an example configuration of a system 400, in which the MUX 110 and the MUX 190 of the network 100 have been replaced by a hub 410, and the MUX 150 and the MUX 180 have been replaced by a hub 420. Red channels are denoted by long-dashed arrows, and blue channels are denoted by short-dashed arrows. In the illustrated embodiments, transmit from and receive at the HUB 410 are done using one wavelength range, e.g. red, and transmit from and receive at the HUB 420 are done using a different wavelength range, e.g. blue. Three nodes are shown schematically and designated with Roman numerals I, II and III. In this embodiment, each node requires an OT configured to transmit on a red channel and receive on a blue channel, and another OT configured to transmit on a blue channel and receive on a red channel. While there is no functional difficulty with such a system, the difference in OTs at each node adds to system complexity and cost, and creates the potential for mis-configuration such as by inadvertently swapping the OT variants.

Figure 5:
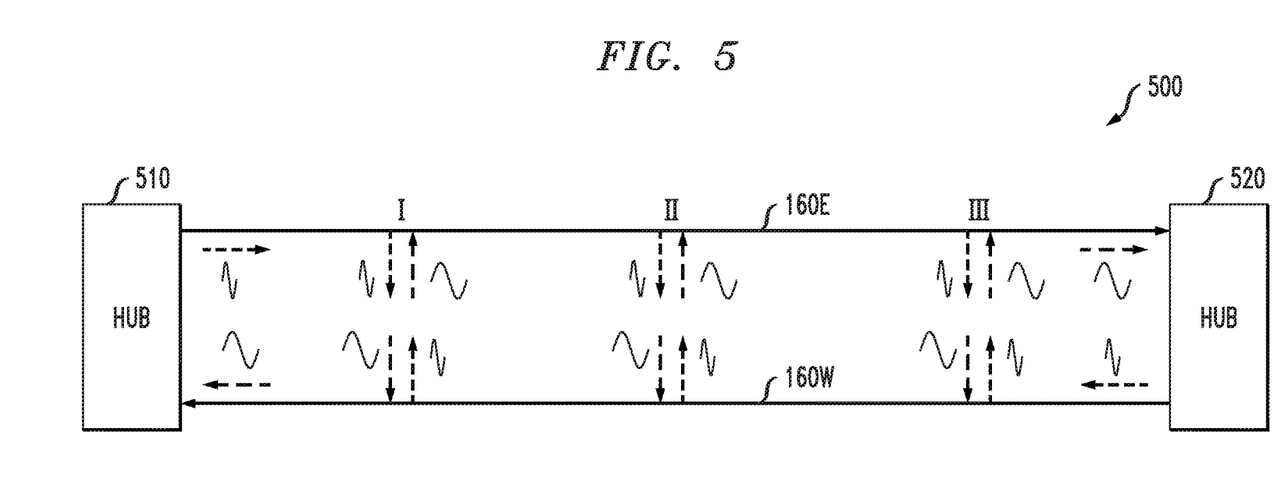
FIG. 5 illustrates an example configuration of a system according to another embodiment, in which two network hubs each transmit channels in one color group, and receive channels in another different color group.

FIG. 5 illustrates another example configuration of a system 500, wherein the MUX 110 and the MUX 190 of the network 100 have been replaced by a hub 510, and the MUX 150 and the MUX 180 have been replaced by a hub 520. Again, three nodes are designated I, II and III. In this embodiment, each of the hubs 510, 520 transmit blue channels and receive red channels. Moreover, each node I, II and III drops blue channels and adds red channels in both the E-W and W-E directions. As a result all of the node OTs may be configured the same, eliminating possible configurational errors. Due to the reduced complexity, e.g., the configuration exemplified by the system 500, it may be preferable in some cases to transmit channels of one color, e.g. red, in one direction of an optical network, and to transmit channels of another color, e.g. blue, in the opposite direction.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. Moreover, a first element and second element may be implemented by a single element able to provide the necessary functionality of separate first and second elements.

As used herein the description, the term "and" is used in both the conjunctive and disjunctive sense and includes any and all combinations of one or more of the associated listed items. It will be further understood that the terms "comprises", "comprising,", "includes" and "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The invention claimed is:

1. An apparatus, comprising:
   a first optical splitter configured to split a received wavelength-division multiplexed (WDM) optical signal into first and second signal portions;
   a first high-pass optical filter configured to pass shorter-wavelength channels of the first signal portion in a first wavelength band and to block longer-wavelength channels of the first signal portion in a non-overlapping second wavelength band, a shortest-wavelength channel of said second wavelength band being longer than a longest-wavelength channel of said first wavelength band
   a first low-pass optical filter configured to block the shorter-wavelength channels and to pass the longer-wavelength channels; and
   an optical combiner configured to combine the second signal portion with an added wavelength channel passed by the first low-pass optical filter.

2. The apparatus of claim 1, further comprising an optical transponder configured to recover data from a selected wavelength channel passed by the first high-pass optical filter.

3. The apparatus of claim 1, further comprising:
   a second optical splitter configured to split an output of the combiner into third and fourth signal portions; and
   a second high-pass optical filter configured to pass the shorter-wavelength channels of the third signal portion and to block the longer-wavelength channels of the third signal portion.

4. The apparatus of claim 3, further comprising:
a second low-pass optical filter configured to block the shorter wavelength channels and to pass the longer-wavelength channels; and
a second optical combiner configured to combine the fourth signal portion with an added wavelength channel passed by the second low-pass optical filter.

5. The apparatus of claim 4, further comprising:
a first optical transmitter configured to output a first longer-wavelength channel in the second wavelength band to the first low-pass optical filter; and
a second optical transmitter configured to output a second longer-wavelength channel in the second wavelength band to the second low-pass optical filter.

6. A system, comprising:
first and second low-pass optical filters configured to block wavelength channels of a first wavelength band of a wavelength-division multiplexed (WDM) optical signal and to pass wavelength channels of a second wavelength band of said WDM optical signal, a shortest-wavelength channel of said second wavelength band being longer than a longest-wavelength channel of said first wavelength band;
a first optical transmitter configured to direct a first wavelength channel of the second wavelength band to the first low-pass optical filter;
a second optical transmitter configured to direct a second wavelength channel of the second wavelength band to the second low-pass optical filter;
an optical combiner configured to combine the first and second wavelength channels
a high-pass optical filter configured to pass wavelength channels of the first wavelength band and to block wavelength channels of the second wavelength band; and
an optical splitter configured to split output of the first low-pass optical filter into a first signal portion directed toward the high-pass optical filter and a second signal portion directed toward the optical combiner.

7. A method, comprising:
configuring a first optical splitter to split a wavelength-division multiplexed (WDM) optical signal into first and second signal portions;
configuring a high-pass optical filter to receive the first signal portion, wherein the high-pass optical filter is configured to pass shorter-wavelength channels of the WDM optical signal and to block longer-wavelength channels of the WDM optical signal, a shortest-wavelength channel of said second wavelength band being longer than a longest-wavelength channel of said first wavelength band
configuring a first low-pass optical filter, adapted to block the shorter-wavelength channels and to pass the longer-wavelength channels, to receive a first added wavelength channel in the second wavelength band; and
configuring an optical combiner to combine the second signal portion with the first added wavelength channel passed by the first low-pass optical filter.

8. The method of claim 7, further comprising configuring an optical transponder to recover data from a selected one of the shorter-wavelength channels passed by the high-pass optical filter.

9. The method of claim 7, further comprising:
configuring a second optical splitter to split the output of the combiner into third and fourth signal portions; and
configuring a second high-pass optical filter to receive the third signal portion, the second high-pass optical filter being adapted to pass wavelength channels in the first wavelength band and block wavelength channels in the second wavelength band.

10. The method of claim 9, further comprising:
configuring a second low-pass optical filter to receive a second added-wavelength channel in the second wavelength band, the second low-pass optical filter being adapted to block said shorter-wavelength channels and to pass said longer-wavelength channels; and
configuring a second optical combiner to combine said second added wavelength channel with the fourth signal portion.

11. The method of claim 10, further comprising:
configuring a first optical transmitter to output a first longer-wavelength channel to the first low-pass optical filter; and
configuring a second optical transmitter to output a second longer wavelength channel to the second low-pass optical filter.

12. A method, comprising:
configuring a first low-pass optical filter to receive a first added-wavelength channel from a first optical transmitter, the first low-pass optical filter being adapted to block shorter-wavelength channels and to pass longer-wavelength channels;
configuring a second low-pass optical filter to receive a second added-wavelength channel from a second optical transmitter, the second low-pass optical filter being adapted to block said shorter-wavelength channels and to pass said longer-wavelength channels;
configuring an optical combiner to combine the first and second added wavelength channels passed by the first and second low-pass optical filters;
configuring an optical splitter to split output of the first optical filter into a first signal portion directed to the combiner and a second signal portion; and
configuring a high-pass optical filter to receive the second signal portion, the high-pass optical filter being adapted to pass said shorter wavelength channels and block said longer wavelength channels.

13. A network node of a metro optical network, comprising:
a high-pass optical filter configured to pass shorter-wavelength channels of a received wavelength-division multiplexed (WDM) optical communication signal and to block longer-wavelength channels of the WDM signal;
an optical splitter configured to split a received optical signal into first and second signal portions and to direct the first signal portion to the high-pass optical filter;
a low-pass optical filter configured to block said shorter-wavelength channels and to pass said longer-wavelength channels;
an optical combiner configured to combine output of the low-pass optical filter with the second signal portion from the optical splitter;
an optical receiver configured to recover data from a first selected one of said shorter-wavelength channels passed by the high-pass optical filter; and
an optical transmitter configured to direct to the low-pass optical filter a second selected one of said longer-wavelength channel.

14. An apparatus, comprising:
a first optical splitter configured to split a received wavelength-division multiplexed (WDM) optical signal into first and second signal portions;
a first low-pass optical filter configured to pass redder-wavelength channels of the first signal portion in a first wavelength band and to block bluer-wavelength channels of the first signal portion in a second wavelength band, a longest-wavelength channel of said second wavelength band being shorter than a shortest-wavelength channel of said first wavelength band;

a first high-pass optical filter configured to block the redder-wavelength channels and to pass the bluer-wavelength channels; and an optical combiner configured to combine the second signal portion with an added wavelength channel passed by the first high-pass optical filter.

15. The apparatus of claim 14, further comprising an optical transponder configured to recover data from a selected wavelength channel passed by the first low-pass optical filter.

16. The apparatus of claim 14, further comprising:
a second optical splitter configured to split an output of the optical combiner into third and fourth signal portions; and
a second low-pass optical filter configured to pass the redder-wavelength channels of the third signal portion and to block the bluer-wavelength channels of the third signal portion.

17. The apparatus of claim 16, further comprising:
a second high-pass optical filter configured to block the redder-wavelength channels and to pass the bluer-wavelength channels; and
a second optical combiner configured to combine the fourth signal portion with an added wavelength channel passed by the second high-pass optical filter.

18. The apparatus of claim 17, further comprising:
a first optical transmitter configured to output a first bluer-wavelength channel in the second wavelength band to the first high-pass optical filter; and
a second optical transmitter configured to output a second bluer-wavelength channel in the second wavelength band to the second high-pass optical filter.

19. A system, comprising:
first and second high-pass optical filters configured to block wavelength channels of a first wavelength band of a wavelength-division multiplexed (WDM) optical signal and to pass wavelength channels of a second wavelength band of said WDM optical signal, a longest-wavelength channel of said second wavelength band being shorter than a shortest-wavelength channel of said first wavelength band;
a first optical transmitter configured to direct a first wavelength channel of the second wavelength band to the first high-pass optical filter;
a second optical transmitter configured to direct a second wavelength channel of the second wavelength band to the second high-pass optical filter;
an optical combiner configured to combine the first and second wavelength channels;
a low-pass optical filter configured to pass wavelength channels of the first wavelength band and to block wavelength channels of the second wavelength band; and
an optical splitter configured to split output of the first high-pass optical filter into a first signal portion directed toward the low-pass optical filter and a second signal portion directed toward the optical combiner.

20. A method, comprising:
configuring a first optical splitter to split a wavelength-division multiplexed (WDM) optical signal into first and second signal portions;

configuring a low-pass optical filter to receive the first signal portion, wherein the low-pass optical filter is configured to pass longer-wavelength channels in a first wavelength band of the WDM optical signal and to block shorter-wavelength channels in a second wavelength band of the WDM optical signal, a longest-wavelength channel of said second wavelength band being shorter than a shortest-wavelength channel of said first wavelength band;

configuring a first high-pass optical filter, adapted to block the longer-wavelength channels and to pass the shorter-wavelength channels, to receive a first added wavelength channel in the second wavelength band; and configuring an optical combiner to combine the second signal portion with the first added wavelength channel passed by the first high-pass optical filter.

21. The method of claim 20, further comprising configuring an optical transponder to recover data from a selected one of the longer-wavelength channels passed by the low-pass optical filter.

22. The method of claim 20, further comprising:
configuring a second optical splitter to split the output of the optical combiner into third and fourth signal portions; and
configuring a second low-pass optical filter to receive the third signal portion, the second low-pass optical filter being adapted to pass wavelength channels in the first wavelength band and block wavelength channels in the second wavelength band.

23. The method of claim 22, further comprising:
configuring a second high-pass optical filter to receive a second added-wavelength channel in the second wavelength band, the second high-pass optical filter being adapted to block said longer-wavelength channels and to pass said shorter-wavelength channels; and
configuring a second optical combiner to combine said second added wavelength channel with the fourth signal portion.

24. The method of claim 23, further comprising:
configuring a first optical transmitter to output a first shorter-wavelength channel to the first high-pass optical filter; and
configuring a second optical transmitter to output a second shorter wavelength channel to the second high-pass optical filter.

25. A method, comprising:
configuring a first high-pass optical filter to receive a first added-wavelength channel from a first optical transmitter, the first high-pass optical filter being adapted to block longer-wavelength channels and to pass shorter-wavelength channels;
configuring a second high-pass optical filter to receive a second added-wavelength channel from a second optical transmitter, the second high-pass optical filter being adapted to block said longer-wavelength channels and to pass said shorter-wavelength channels;
configuring an optical combiner to combine the first and second added wavelength channels passed by the first and second high-pass optical filters;
configuring an optical splitter to split output of the first optical filter into a first signal portion directed to the combiner and a second signal portion; and
configuring a low-pass optical filter to receive the second signal portion, the low-pass optical filter being adapted to pass said longer wavelength channels and block said shorter wavelength channels.

26. A network node of a metro optical network, comprising:
- a low-pass optical filter configured to pass longer-wavelength channels of a received wavelength-division multiplexed (WDM) optical communication signal and to block shorter-wavelength channels of the WDM signal;
- an optical splitter configured to split a received optical signal into first and second signal portions and to direct the first signal portion to the first low-pass optical filter;
- a high-pass optical filter configured to block said longer-wavelength channels and to pass said shorter-wavelength channels;
- an optical combiner configured to combine output of the high-pass optical filter with the second signal portion from the optical splitter;
- an optical receiver configured to recover data from a first selected one of said longer-wavelength channels passed by the low-pass optical filter; and
- an optical transmitter configured to direct to the high-pass optical filter a second selected one of said shorter-wavelength channel.

* * * * *